US012546656B2

(12) United States Patent
Williamson et al.

(10) Patent No.: US 12,546,656 B2
(45) Date of Patent: Feb. 10, 2026

(54) COLORIMETRIC COMPLIANCE CONTROL DEVICE

(71) Applicant: Nissan North America, Inc., Franklin, TN (US)

(72) Inventors: Andrew Williamson, Smyrna, TN (US); Andrew Rose, Nashville, TN (US); Joshua Patterson, Smithville, TN (US); Eric Grizzard, Rockvale, TN (US); Steven Bradford, Cookeville, TN (US); Randal T. Rausch, Murfreesboro, TN (US)

(73) Assignees: NISSAN NORTH AMERICA, INC., Franklin, TN (US); The EOSYS Group, Inc., Smyrna, TN (US)

( * ) Notice: Subject to any disclaimer, the term of this patent is extended or adjusted under 35 U.S.C. 154(b) by 301 days.

(21) Appl. No.: 18/180,540

(22) Filed: Mar. 8, 2023

(65) Prior Publication Data

US 2024/0302214 A1    Sep. 12, 2024

(51) Int. Cl.
*G01J 3/46* (2006.01)
*G05B 13/02* (2006.01)

(52) U.S. Cl.
CPC .......... *G01J 3/462* (2013.01); *G05B 13/0265* (2013.01); *G01J 3/463* (2013.01); *G01J 2003/467* (2013.01)

(58) Field of Classification Search
CPC ........ G05B 13/0265; G01J 3/46; G01J 3/463; G01J 3/02; B05D 5/005

(Continued)

(56) References Cited

U.S. PATENT DOCUMENTS 7,536,231 B2 *  5/2009  McClanahan .......... G01J 3/462
                                                        700/32
8,782,026 B2   7/2014  Poland et al.
(Continued)

FOREIGN PATENT DOCUMENTS

CA    2434555 C  *  8/2010  ................ G01J 3/46
CN   115244149 B  *  9/2023
JP   2021188046 A *  12/2021

OTHER PUBLICATIONS

The New Technology X-Rite MA98™; Portable Multi-Angle Spectrophotometer; 6 pages; printed from the internet on May 2023; published 2008 (Year: 2008).*

*Primary Examiner* — Ronald D Hartman, Jr.
(74) *Attorney, Agent, or Firm* — Spencer Fane, LLP

(57) ABSTRACT

A colorimetric compliance control device includes a electronic communication device, a non-transitory computer readable medium, an electronic controller. The electronic communication device is programmed to electronically receive colorimetric information regarding a vehicle component. The non-transitory computer readable medium electronically stores a non-transitory computer learning model using the colorimetric information acquired by the detector as a first input. The non-transitory computer learning model generates a colorimetric value as an output value related to the colorimetric information. The electronic controller is programmed to compare the output value with a predetermined exemplary value. The electronic controller is programmed to determine when the output value deviates from the predetermined exemplary value.

20 Claims, 7 Drawing Sheets

(58) Field of Classification Search
USPC .......................................................... 700/109
See application file for complete search history.

(56) References Cited

U.S. PATENT DOCUMENTS

| | | | |
|---|---|---|---|
| 2002/0106121 A1* | 8/2002 | McClanahan | G06T 7/90 |
| | | | 382/156 |
| 2002/0191843 A1* | 12/2002 | McClanahan | G06F 16/951 |
| | | | 382/162 |
| 2004/0073526 A1* | 4/2004 | McClanahan | G01J 3/462 |
| | | | 356/402 |
| 2015/0336502 A1 | 11/2015 | Hillis et al. | |

* cited by examiner

| Color Metric | | Optical Angle (degrees) | | | | |
|---|---|---|---|---|---|---|
| | | 15 | 25 | 45 | 75 | |
| L (light-dark) | 34 | 0 | 0 | 0 | 0 | |
| a (red-green) | 32A | 0 | 0 | 0 | 0 | |
| b (yellow-blue) | 32B | 0 | 0 | 0 | 0 | |
| Si (sparkle intensity) | 34A | 0 | | | 0 | |
| | | 15 total metrics | | | | |

FIG. 8

COLORIMETRIC COMPLIANCE CONTROL DEVICE

BACKGROUND

Technical Field

The present disclosure generally relates to a colorimetric compliance control device. More specifically, the present disclosure relates to a colorimetric compliance control device to be implemented for vehicle components.

Background Information

During the vehicle assembly process, different vehicle components are supplied by different parties. Therefore, different vehicle components will be painted at different locations. Paint and color appearance can vary due to a variety of factors, such as different batches of paint having been mixed differently, variations in the paint application process, the temperature and humidity of application, variations in the electrostatic voltage of the applicators, etc. It has been known that mismatches between the colors of vehicle body components are not discovered until the vehicle components 16 reach an assembly line for installation. In particular, subtle discrepancies between the colors of different vehicle components are not noticed until the vehicle components 16 are displayed side-by-side. At that point, there may be little opportunity to correct the problem during the assembly process.

SUMMARY

In view of the state of the known technology, one aspect of the present disclosure is to provide a colorimetric compliance control device comprises a electronic communication device, a non-transitory computer readable medium, an electronic controller. The electronic communication device is programmed to electronically receive colorimetric information regarding a vehicle component. The non-transitory computer readable medium electronically stores a non-transitory computer learning model using the colorimetric information acquired by the detector as a first input. The non-transitory computer learning model generates a colorimetric value as an output value related to the colorimetric information. The electronic controller is programmed to compare the output value with a predetermined exemplary value. The electronic controller is programmed to determine when the output value deviates from the predetermined exemplary value.

In view of the state of the known technology, one aspect of the present disclosure is to provide a non-transitory computer learning model. The non-transitory computer learning model is disposed upon a non-transitory computer readable storage medium and executable by a computer. The non-transitory computer learning model comprises an input layer, an output layer and an intermediate layer. The input layer is a layer to which input values related to colorimetric information is input. The colorimetric information relates to a vehicle component that is acquired by a detector. The output layer is a layer from which a colorimetric output value is output. The intermediate layer is trained by training data including the input values as an input and using colorimetric information acquired by one or more detectors at a plurality of predetermined detecting angles as another input. The learning model is configured to be used for processing the input layer with the input values. The learning model is configured to perform a calculating based on the intermediate layer. The learning model is configured to output from the output layer a probability that the colorimetric value deviates from an exemplary value.

BRIEF DESCRIPTION OF THE DRAWINGS

Referring now to the attached drawings which form a part of this original disclosure:

FIG. 8 is another graph depicting samples of input values that are inputted into the non-transitory computer learning model.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
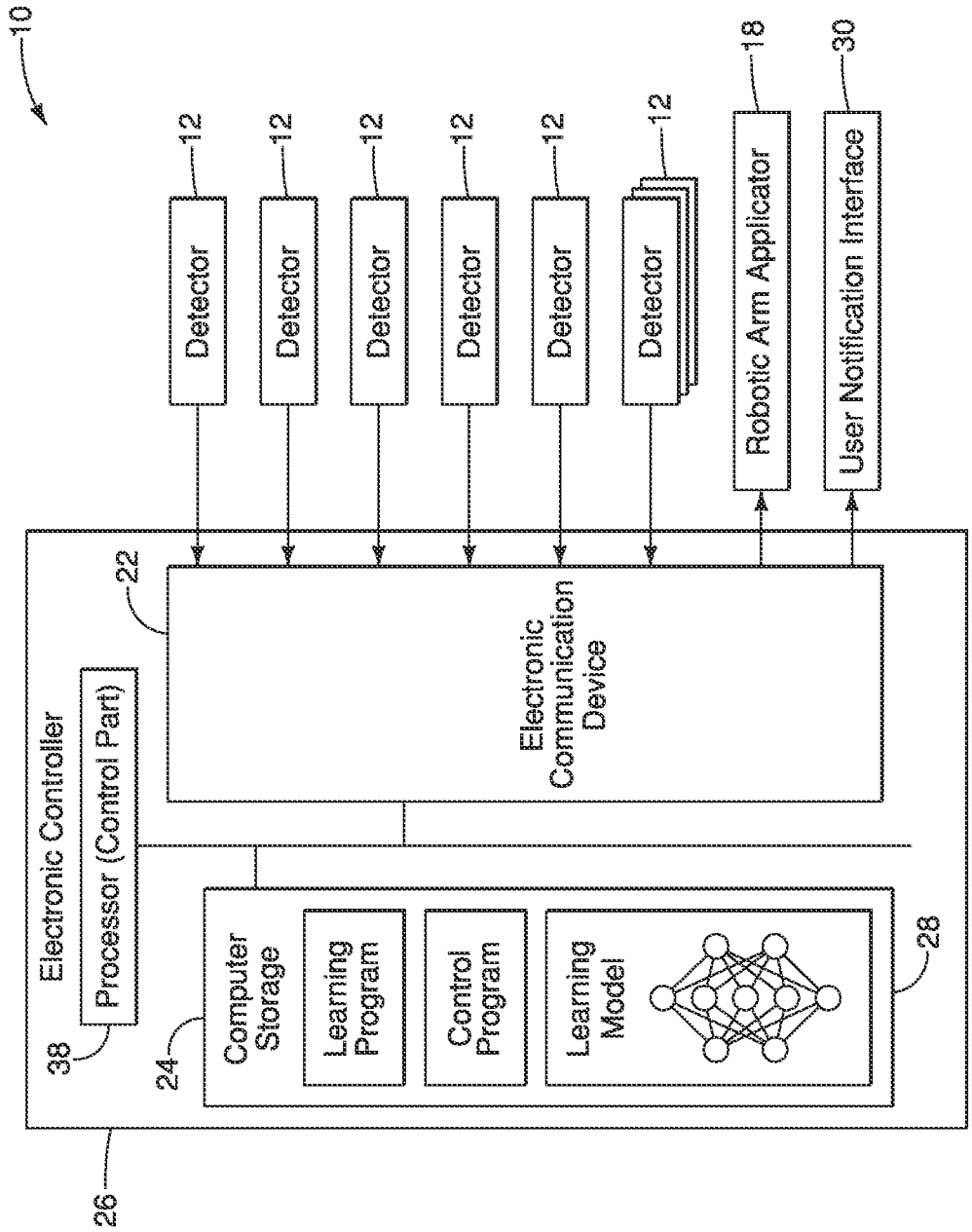
FIG. 1 is a schematic view of the colorimetric compliance control device in accordance with an illustrated embodiment.

Referring initially to FIG. 1, a colorimetric compliance control device 10 is illustrated in accordance with an illustrated embodiment. The colorimetric compliance control device 10 further comprises a detector 12 configured to acquire colorimetric information 14 regarding a vehicle component 16. In the illustrated embodiment, the vehicle component 16 includes vehicle body parts that partially defines a vehicle's outer structure, as shown illustratively in FIG. 3. For example, the vehicle component 16 can include the vehicle's left rear fascia, right rear fascia, left front fascia, right front fascia, etc. The vehicle component 16 can also include the vehicle's bumper, hood, roof structure, etc. Therefore, the detector 12 detects a color of the vehicle component 16, such as the paint color of the vehicle component 16.

For example, the detector 12 can be a color scanning device capable of scanning smooth or textured surfaces. The detector 12 is preferably a spectral photometer that is a high-quality colorimeter that can measure and accurately describe any color. The spectral photometer can illuminate the surface of the vehicle component 16 with the entire spectrum of the visible light. The remission values of certain wavelengths together determines the measured value.

Figure 9:
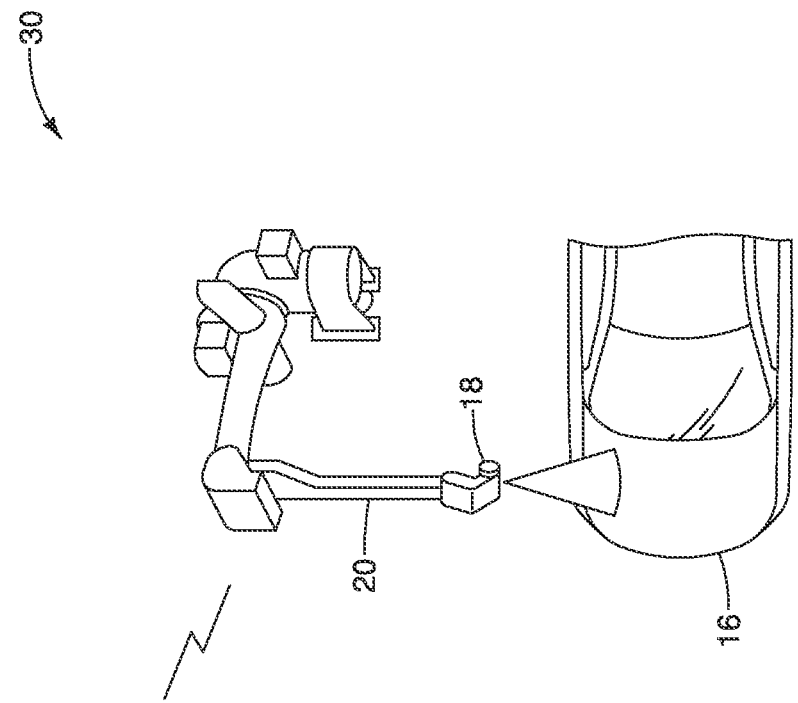
FIG. 9 is a schematic view of a tagging system that can implement the colorimetric compliance control device.
Figure 9:
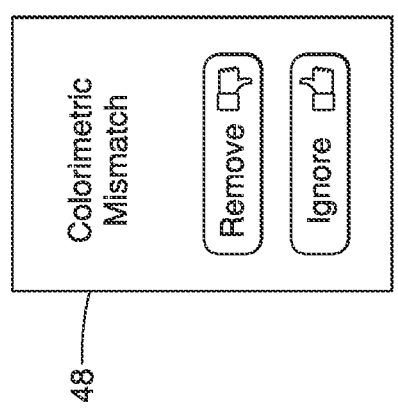

As best seen in FIGS. 1 and 9, the colorimetric compliance control device 10 further comprises a colorimetric applicator 18 configured to apply color to the vehicle component 16. The colorimetric applicator 18 can be a robotic painting arm 20 designed to machine spray paint vehicle components 16, such as shown illustratively in FIG. 9. The applicator 18 is capable of multiple-axis motion, such as five or six axis motion to apply paint to the vehicle component 16 at desired angles. The applicator 18 can be other types of electronic paint applicators 18 as needed and/or desired.

In the illustrated embodiment, the colorimetric compliance control device 10 comprises a electronic communication device 22, a non-transitory computer readable medium 24 and an electronic controller 26. As shown, the electronic controller 26 preferably includes the electronic communication device 22 and the non-transitory computer readable medium 24. The detector 12 includes an electronic communications unit (not shown) in communication with the electronic communication device 22 to transmit the colorimetric information 14 of the vehicle component 16 acquired by the detector 12. That is, the detector 12 electronically transmits color data 32 of the vehicle component 16 to the electronic communication device 22 of the electronic controller 26.

The non-transitory computer readable medium 24 electronically stores a non-transitory computer learning model 28 (hereinafter learning model 28), such as a neural network. The control device 10 is capable of controlling the applicator 18 (along with other actuators to be discussed) in accordance with determinations made by the electronic controller 26 based on colorimetric information 14 acquired by the detector 12, as will be further described below.

While the learning model 28 of the illustrated embodiment is illustrated as a neural network, it will be apparent to those skilled in the vehicle field from this disclosure that the control device 10 can be implemented with other types of learning models, such as logistic regression, K-nearest neighbors model, etc.

During the vehicle assembly process, different vehicle components 16 are supplied by different parties. Therefore, different vehicle components 16 will be painted at different locations. Paint and color appearance can vary due to a variety of factors, such as different batches of paint having been mixed differently, variations in the paint application process, the temperature and humidity of application, variations in the electrostatic voltage of the applicators 18, etc. It has been known that mismatches between the colors of vehicle body components are not discovered until the vehicle components 16 reach an assembly line for installation. In particular, subtle discrepancies between the colors of different vehicle components 16 are not noticed until the vehicle components 16 are displayed side-by-side. At that point, there may be little opportunity to correct the problem during the assembly process.

Therefore, the colorimetric compliance control device 10 is provided with the learning model 28 that is trained to identify colorimetric values of vehicle components 16 based on various input values V1 acquired by the detector 12. The learning model 28 is configured to generate output values V2 based on the input values V1 acquired. The colorimetric compliance control device 10 is provided with the electronic controller 26 that is programmed to identify inconsistency on vehicle components 16 by comparing the output values V2 generated by the learning model 28 with predetermined exemplary values V3. The colorimetric compliance control device 10 further comprises a notification module having a user notification interface 30 that is programmed to notify users or assembly managers of potential or identified mismatches.

The colorimetric compliance control device 10 enables the technological improvement to the field of paint application disharmony in the vehicle component field by providing a method or process in which disharmony can be identified prior to paint application or prior to assembly.

Figure 3:
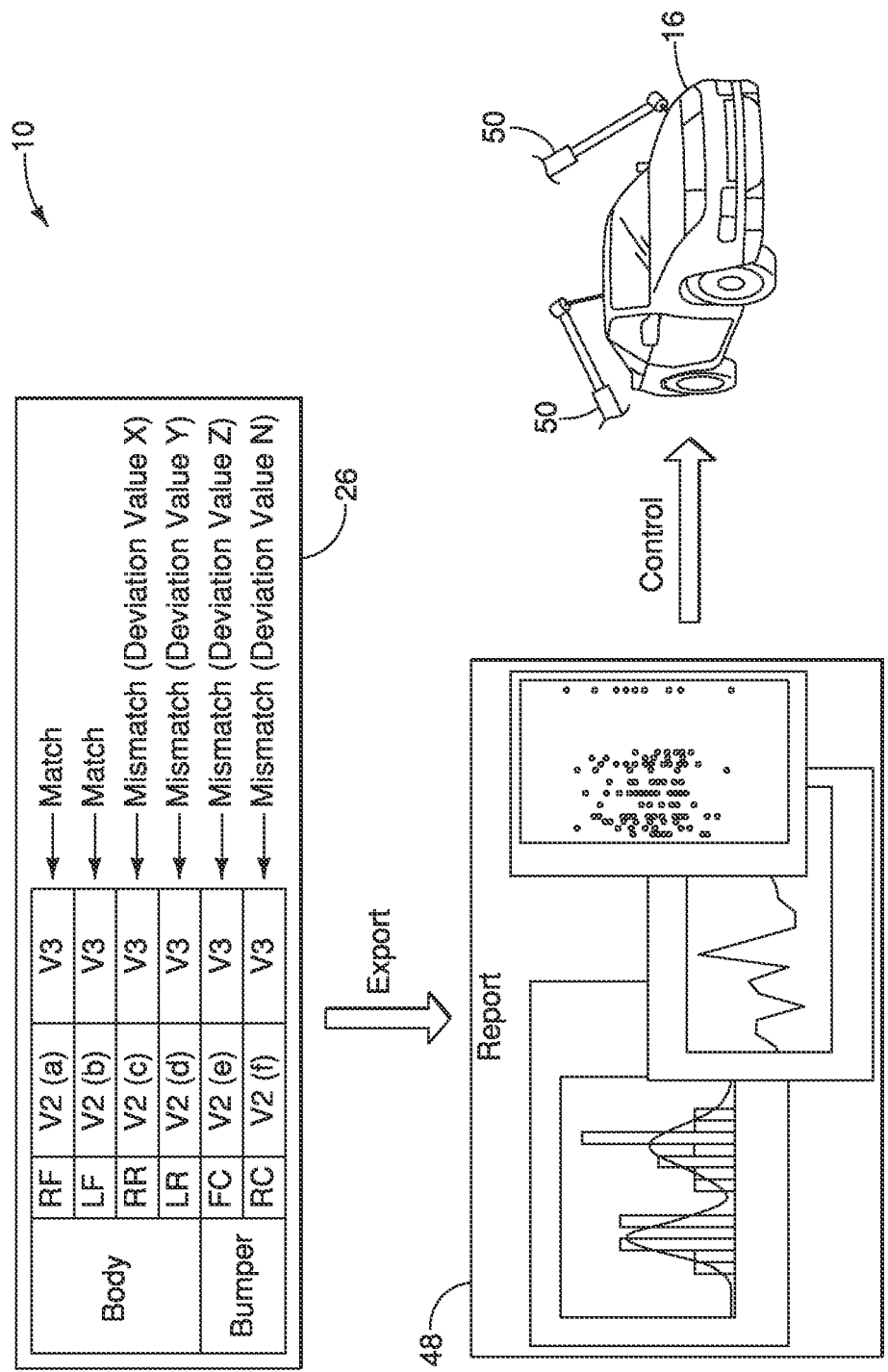
FIG. 3 is a schematic view of the control operations of an electronic controller of the colorimetric compliance control device.

As stated, the detector 12 collects colorimetric information 14 of the vehicle component 16. The colorimetric information 14 includes at least color data 32, sparkle data 34 and coarseness data 36 of the vehicle component 16. Referring to FIG. 8, the color data 32 can include a red-green metric 32A, such as shown in FIG. 3. The red-green metric 32A can be a redness-greenness of the vehicle component's 16 detected color. The color data 32 can further include a yellow-blue metric 32B, which can be a yellowness-blueness of the vehicle component's 16 detected color.

The sparkle data 34 includes a sparkle metric. For example, the sparkle metric can include the chromaticness (e.g., hue and saturation) of the vehicle component 16 that is detected by the detector 12. The sparkle data 34 can also include a lightness-darkness metric. The detector 12 preferably also captures coarseness data 36. That is, the detector 12 can capture whether the color of the vehicle component 16 is matte or sheen.

Preferably, the detector 12 also captures the color data 32, the sparkle data 34 and the coarseness data 36 at different angles of the detector 12 with respect to the vehicle component 16. Therefore, the detector 12 captures the colorimetric information 14 at different angles and can send the colorimetric information 14 to the electronic controller 26 with respect to the different detecting angles of the detector 12. Preferably, the detector 12 can detect the colorimetric information 14 at 15, 25, 45 and 75 degrees of the detector 12. Preferably, the detector 12 can also detect paint application conditions (e.g., gun tip liquid temperature, discharge, air pressure, gun speed, and R/B number) and drying conditions (e.g., oven temperature, air flow, and humidity).

The colorimetric information 14 detected at the different detecting angles will all be transmitted to the electronic controller 26 via the electronic communications device 22. The colorimetric information 14 detected at different detecting angles will be input to the learning model 28. Therefore, the colorimetric information 14 is considered a first input to the learning model 28. The detecting angles are considered a second input V1B to the learning model 28.

Figure 5:
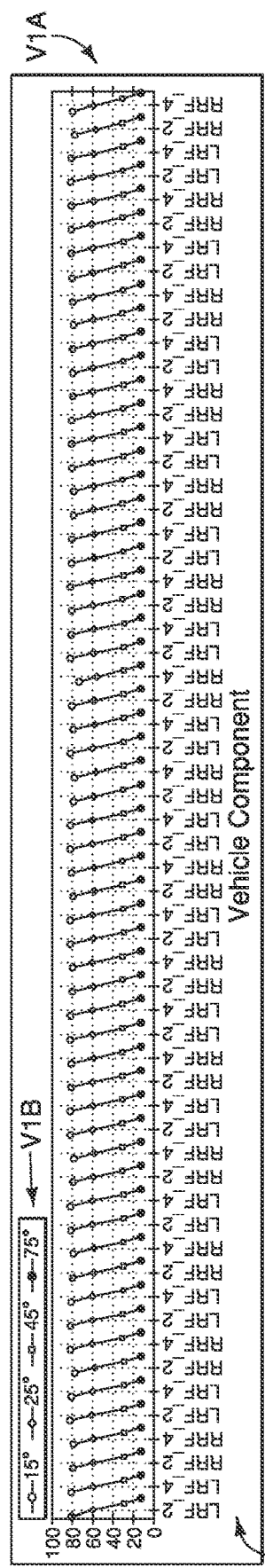
FIG. 5 is a graph of samples of input values that are inputted into the non-transitory computer learning model.
Figure 6:
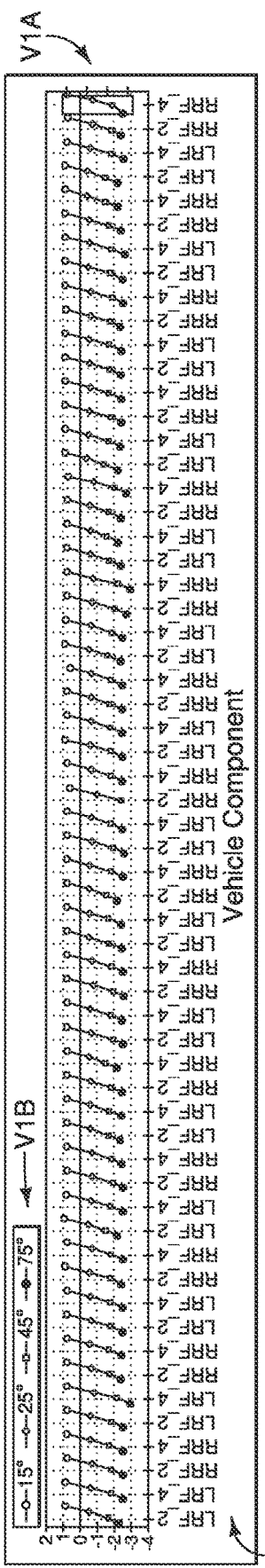
FIG. 6 is another graph depicting samples of input values that are inputted into the non-transitory computer learning model.
Figure 7:
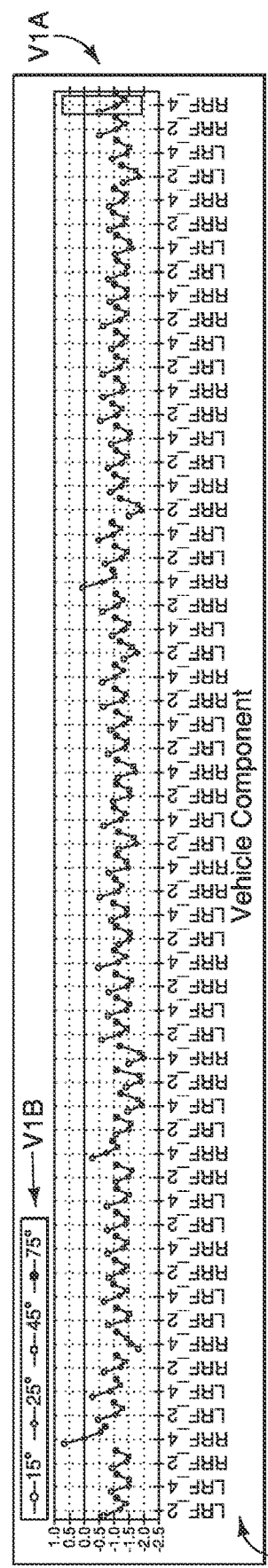
FIG. 7 is another graph depicting samples of input values that are inputted into the non-transitory computer learning model.

Examples of colorimetric information 14 detected at different predetermined angles can be illustrated in FIGS. 5 to 7. The colorimetric information 14 are graphed as red-green metrics 32A, yellow-blue metrics 32B, lightness-darkness metrics 34 and coarseness metrics 34A at the predetermined detecting angles 15, 25, 45 and 75 degrees. It will be apparent to those skilled in the vehicle field that the detecting angles can include additional detecting angles for the detector 12 to detect colorimetric information 14 as needed and/or desired. The colorimetric information 14 is displayed with reference to different vehicle components 16, such as left rear fascia (LRF), right rear fascia (RRF), etc.

The control device 10 of the illustrated embodiment preferably includes a plurality of detectors 12 detecting colorimetric information 14 for a plurality of vehicle components 16. Therefore, the electronic controller 26 can be implemented with a plurality of detectors 12 at scale such that a high volume of colorimetric information 14 will be automatically uploaded to the electronic controller 26 on a continuous basis upon detection of the colorimetric information 14 and are then automatically inputted to the learning model 28.

As stated, the electronic communication device 22 of the electronic controller 26 is programmed to electronically receive colorimetric information 14 regarding the vehicle component 16. While a single vehicle component 16 is referenced in this disclosure, it will be apparent to those skilled in the vehicle field from this disclosure that the control device 10 can be implemented for a plurality of vehicle components 16 for detecting colorimetric information 14 of the plurality of vehicle components 16.

The term "electronic communication device" as used herein includes wired and wireless communication devices. That is, the electronic communication device 22 can be a wired connection that is established between the detectors 12 and the electronic controller 26. Therefore, the electronic communication device 22 can include a power-line communication (PLC) that utilizes modulated carrier signals to transmit information between the detectors 12 and the electronic controller 26. The electronic communication device 22 can alternatively include a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field. Here, the electronic communication device 22 can be a one-way wireless communication unit such as a transmitter.

The non-transitory computer readable medium 24 is a data storage device that stores the learning model 28. As used herein, the terminology "data storage" or "computer-readable medium" (also referred to as a processor 38-readable medium) indicates any computer-usable or computer-readable medium or device that can tangibly contain, store, communicate, or transport any signal or information that may be used by or in connection with any processor 38. For example, the computer-readable medium may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium further includes any non-transitory (e.g., tangible) medium that participates in providing data (e.g., instructions) that may be read by a computer (e.g., by the processor 38). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer-readable medium can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The learning model 28 can be created by the processing performed by a processor 38 of the electronic controller 26. The processor 38 functions as a creation part that creates the learning model 28 using a learning algorithm of a deep learning program. The processor 38 also functions as a control part that controls components including the applicator 18 according to the learning model 28 based on output values V2 outputted from the learning model 28 in response to the first and second input values V1A and V1B inputted to the learning model 28.

The processor 38 can include any device or combination of devices capable of manipulating or processing a signal or other information now-existing or hereafter developed, including optical processors, quantum processors, molecular processors, or a combination thereof. For example, the processor 38 can include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof.

As used herein, the terminology "processor 38" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

The processor 38 can execute instructions transmitted by one or more transmission media, including coaxial cables, copper wire and fiber optics, including the wires that comprise a system bus coupled to a processor of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by the processor 38 to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor 38 receives instructions from the computer-readable medium and executes these instructions, thereby performing one or more processes, including one or more of the processes described herein. Such instructions and other data may be stored and transmitted using a variety of computer-readable media.

The learning model 28 of the illustrated embodiment uses a learning algorithm that is supervised deep learning using a neural network (hereinafter referred to as NN). That is, the learning model 28 can use a learning program that includes a plurality of human labeled colorimetric data for previously detected vehicle components 16. Here, the human labeled colorimetric data is considered training data for the learning model 28. The human labeled colorimetric data can include harmony grading of different vehicle components 16 based on the colorimetric information 14 of these vehicle components 16 that are labeled.

Figure 4:
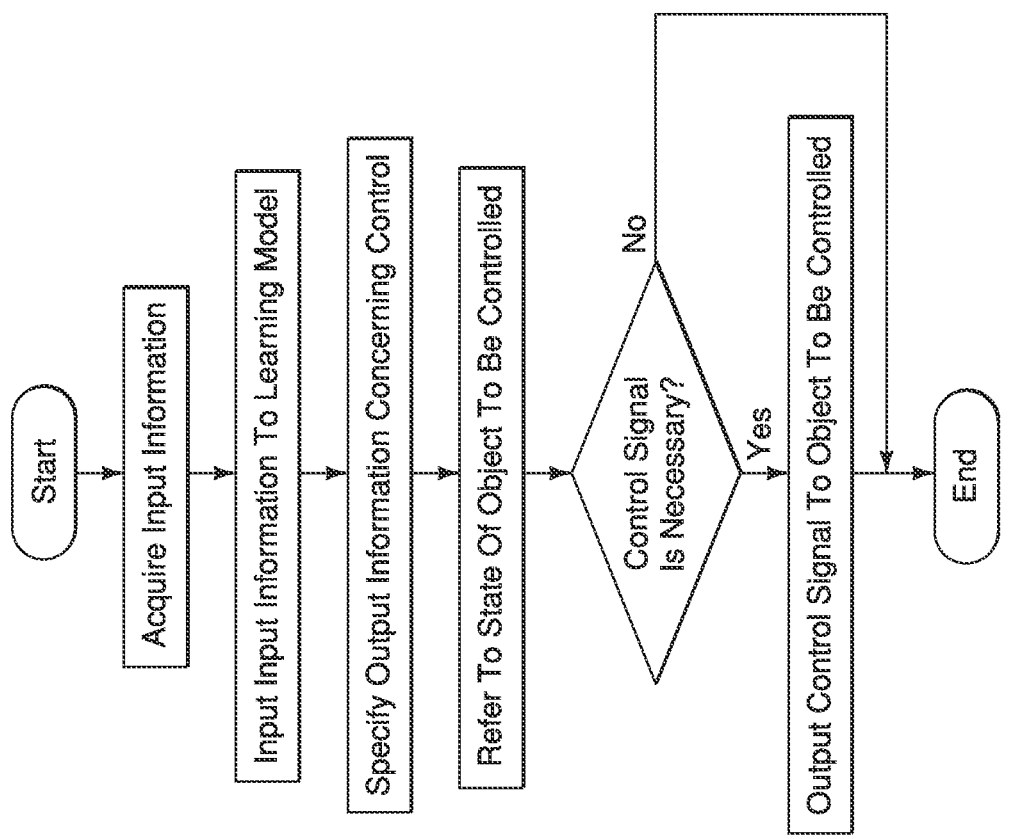
FIG. 4 is a flow chart of the steps of the colorimetric compliance control device.

It will be apparent to those skilled in the vehicle field from this disclosure that the learning model 28 can alternatively utilize a learning algorithm that is an unsupervised learning algorithm, or can be a recurrent neural network. The learning algorithm can be used for reinforcement learning. The processor 38 repeatedly executes the processing procedure in the flowchart of FIG. 4 every predetermined sampling period (detecting period or transmission period of colorimetric information 14 to the electronic controller 26) for each vehicle component 16 being detected.

Figure 2:
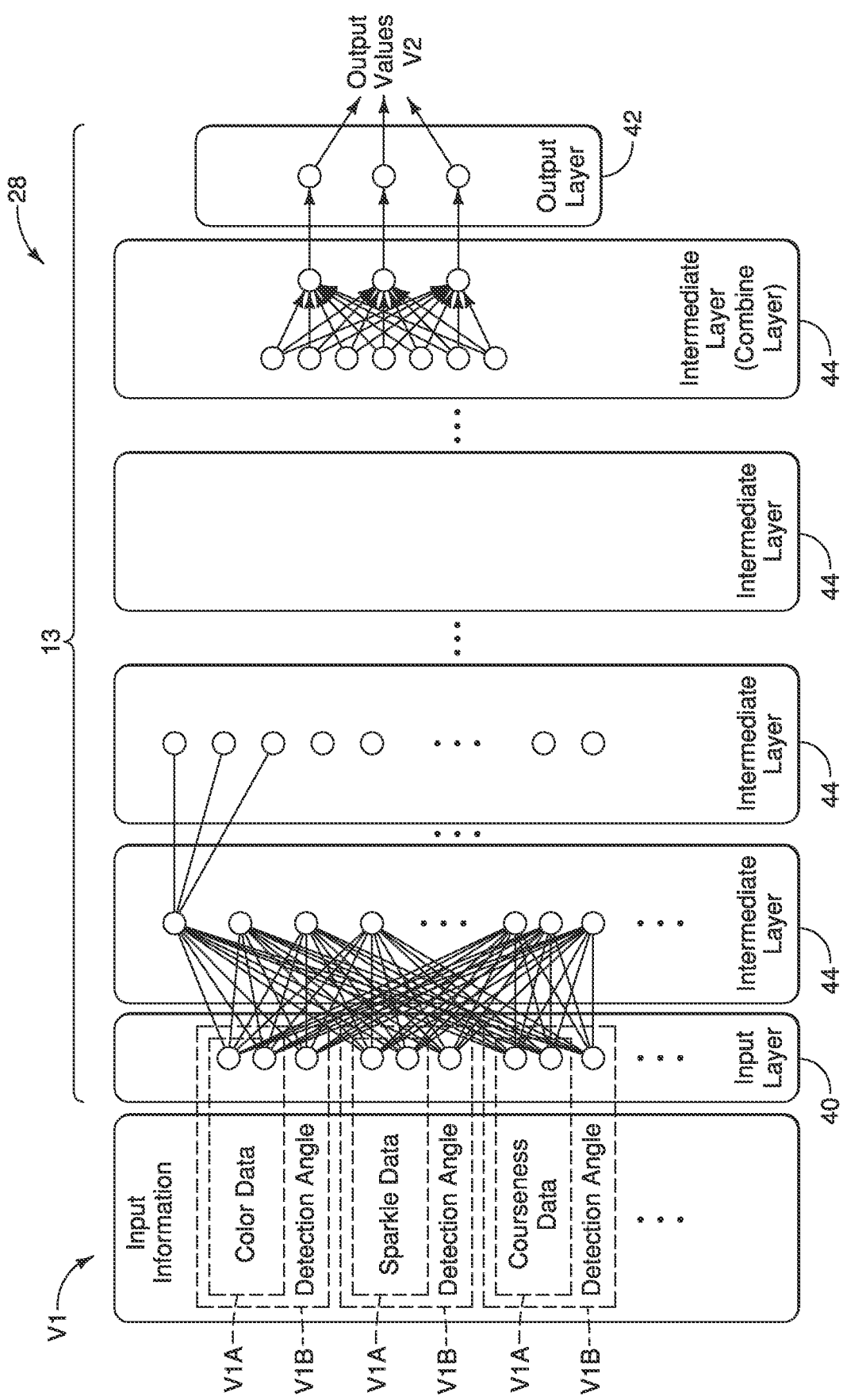
FIG. 2 is a schematic view of a non-transitory computer learning model that is stored on a non-transitory computer readable storage medium of the colorimetric compliance control device.

Referring to FIG. 2, the learning model 28 is executable by a computer (i.e., the processor 38). The learning model 28 comprises an input layer 40 and an output layer 42. The input values V1 related to colorimetric information 14 is input to the input layer 40. The output values V2 are output from the output layer 42. The output values V2 are colorimetric output values V2. The learning model 28 further includes an intermediate layer 44 that is trained by training data. The intermediate layer 44 further uses the colorimetric information 14 acquired by the detector 12 as an input fed into the intermediate layer 44 by the input layer 40. As stated above, the colorimetric information 14 of the input layer 40 includes at least color data 32, sparkle data 34 and coarseness data 36 of the vehicle component 16.

In the illustrated embodiment, the colorimetric information 14 includes the red-green metrics 32A, yellow-blue metrics 32B, lightness-darkness metrics 34 and coarseness metrics 34A at the predetermined detecting angles 15, 25, 45 and 75 degrees. Therefore, the learning model 28 further using the different predetermined angles of the detector 12 as the second input V1B with the colorimetric information 14 as the first input V1A. The predetermined detecting angles include 15 degrees with respect to a reference detector 12 angle. Here, the term "reference detector 12 angle" can be an angle of the detector 12 when the detector 12 is in a starting rest position, such as being angled perpendicularly over the surface of the vehicle component 16. The detecting angle of 15 degrees will be a 15 degree angle with respect to the original starting rest position angle.

Preferably, the predetermined detecting angles further includes 25 degrees with respect to the reference detector 12 angle. More preferably, the predetermined detecting angles further includes 45 degrees with respect to the reference detector 12 angle. Even more preferably, the predetermined angles further include 75 degrees with respect to the reference detector 12 angle. As shown, the learning model 28 is further configured to be used for processing the input layer 40 with the input values V1. Preferably, the learning model 28 measures a series of relationships between the at least color data 32, the sparkle data 34, the coarseness data 36 with the predetermined angles of the colorimetric applicator 18. That is, the learning model 28 performs a calculation based on the intermediate layer 44.

As seen in FIG. 2, the learning model 28 generates the colorimetric value as the output value V2 related to the colorimetric information 14. The learning model 28 preferably outputs from the output layer 42 a probability that the colorimetric value deviates from the exemplary value V3. In the illustrated embodiment, the learning model 28 generates the output value V2 based on the series of relationships between the at least color data 32, the sparkle data 34, the coarseness data 36 with the predetermined angles of the detector 12. As shown, the learning model 28 generates a series of output values V2 (e.g., a plurality of output values V2) based on the series of relationships between the color data 32, the sparkle data 34, the coarseness data 36 with the predetermined angles of the colorimetric applicator 18.

Referring to FIG. 3, the electronic controller 26 is programmed to compare the output value V2 with the predetermined exemplary values V3. The predetermined exemplary values V3 can be pre-labeled human colorimetric data for vehicle components 16 similar to that used for the training data. The predetermined exemplary values V3 can also be pre-set factory values created by the vehicle manufacturer. The exemplary values V3 are colorimetric values that are desired for harmonization of vehicle component 16 painting prior to vehicle assembly. The electronic controller 26 is programmed to determine when the output value V2 deviates from the predetermined exemplary value V3. That is, the electronic controller 26 uses the output values V2 generated by the learning model 28 to determine whether any future detected vehicle components 16 will have colorimetric characteristics that will deviate from the exemplary values V3.

The electronic controller 26 is preferably further programmed to identify and compare colorimetric data of adjacent vehicle components 16. For example, the electronic controller 26 can compare the colorimetric data acquired by the detector 12 of a right front fascia to a right front fender. The electronic controller 26 can be programmed to determine when the colorimetric data acquired by the detector 12 deviates within a particular range.

In other words, the colorimetric compliance control device 10 can be provided to a vehicle assembly process and/or a vehicle component 16 color application process to help harmonization of vehicle components 16 during color application and/or during the process of assembling the vehicle components 16. In the illustrated embodiment, the colorimetric compliance control device 10 includes the user notification interface 30 that generates a visual indicator 48 when the electronic controller 26 determines that the output values V2 deviates from the predetermined exemplary values V3, as seen in FIG. 9. In this way, the colorimetric compliance control device 10 can determine if future detected vehicle components 16 possessing characteristics of the output values V2 will deviate from the exemplary values V3.

The electronic controller 26 can be in electronic communication with applicators 18, such as industrial paint robots 20 are designed to help standardize the distance and path the automatic sprayer takes, thus helping to eliminate the risk of lack of harmonization during paint spraying, as shown in FIG. 3. That electronic controller 26 can therefore control the applicators 18 to apply color in compliance with the exemplary values V3. Additionally, the user notification interface 30 can generate a visual indicator 48 when the electronic controller 26 determines that the output value V2 deviates from the predetermined exemplary value V3, such as shown in FIG. 9. The visual indicator 48 can be provided on an electronic user interface 30 (e.g., a screen on a mobile device or a computer display screen) that is used by an assembly plant associate. The visual indicator 48 can notify that assembly plant associate of potential lack of harmonization between vehicle components 16.

Referring to FIGS. 3 and 9, a vehicle component tagging system 52 is illustrated that comprises the colorimetric compliance control device 10. The tagging system 52 includes the user notification interface 30 configured to display the visual indicator 48 when the electronic controller 26 determines that the output value V2 deviates from the predetermined exemplary values V3. The tagging system 52 can further include an electronic operator (a robotic assembling arm 50) wirelessly operated to remove the vehicle component 16 from an assembly line when the electronic controller 26 determines that the output value V2 deviates from the predetermined exemplary value. In this way, a mismatched vehicle component 16 can be identified, re-routed off the assembly line or at least tagged for inspection.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the colorimetric compliance control device. Accordingly, these terms, as utilized to describe the present invention should be interpreted relative to a vehicle equipped with the colorimetric compliance control device.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially". "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A colorimetric compliance control device comprising:
   an electronic communication device programmed to electronically receive colorimetric information regarding a vehicle component;
   a non-transitory computer readable medium electronically storing a non-transitory computer learning model using the colorimetric information acquired by a detector as a first input, the non-transitory computer learning model generating a colorimetric value as an output value related to the colorimetric information;
   an electronic controller programmed to compare the output value with a predetermined exemplary value, the electronic controller being programmed to determine when the output value deviates from the predetermined exemplary value; and
   a user interface configured to generate a visual indicator that the vehicle component should be removed from an assembly line due to the output value deviating from the predetermined exemplary value.

2. The colorimetric compliance control device according to claim 1, further comprising
   a detector having a wireless communications unit in communication with the electronic communication device to transmit the colorimetric information of the vehicle component acquired by the detector.

3. The colorimetric compliance control device according to claim 1, wherein
   the electronic controller is further programmed to determine when the output value deviates from the predetermined exemplary value within a prescribed range.

4. The colorimetric compliance control device according to claim 1, further comprising
   a colorimetric applicator configured to apply color to the vehicle component at different predetermined angles.

5. The colorimetric compliance control device according to claim 2, wherein
   the non-transitory computer readable medium electronically stores the non-transitory computer learning model further using the different predetermined angles of the detector as a second input.

6. The colorimetric compliance control device according to claim 5, wherein
   the colorimetric information acquired by the detector includes at least color data, sparkle data and coarseness data of the vehicle component.

7. The colorimetric compliance control device according to claim 6, wherein
   the non-transitory computer learning model measures a series of relationships between the at least color data, the sparkle data, the coarseness data with the predetermined angles of the detector.

8. The colorimetric compliance control device according to claim 7, wherein
   the non-transitory computer learning model generates the output value based on the series of relationships between the at least color data, the sparkle data, the coarseness data with the predetermined angles of the detector.

9. The colorimetric compliance control device according to claim 8, wherein the color data includes a red-green metric and a yellow-blue metric.

10. The colorimetric compliance control device according to claim 8, wherein
the sparkle data includes a sparkle metric and a lightness-darkness metric.

11. The colorimetric compliance control device according to claim 8, wherein
the non-transitory computer learning model generates a series of output values based on the series of relationships between the color data, the sparkle data, the coarseness data with the predetermined angles of the colorimetric applicator.

12. A colorimetric compliance control device comprising:
an electronic communication device programmed to electronically receive colorimetric information regarding a vehicle component;
a non-transitory computer readable medium electronically storing a non-transitory computer learning model using the colorimetric information acquired by the detector as a first input, the non-transitory computer learning model generating a colorimetric value as an output value related to the colorimetric information;
an electronic controller programmed to compare the output value with a predetermined exemplary value, the electronic controller being programmed to determine when the output value deviates from the predetermined exemplary value; and
an electronic operator configured to remove the vehicle component from an assembly line when the electronic controller determines that the output value deviates from the predetermined exemplary value.

13. A non-transitory computer learning model disposed upon a non-transitory computer readable storage medium and executable by a computer, the non-transitory computer learning model comprising:
an input layer to which input values related to colorimetric information is input, the colorimetric information relates to a vehicle component that is acquired by a detector;
an output layer from which a colorimetric output value is output; and
an intermediate layer that is trained by training data including the input values as an input and using colorimetric information acquired by one or more detectors at a plurality of predetermined detecting angles as another input,
the learning model being configured to be used for processing the input layer with the input values, performing a calculating based on the intermediate layer, outputting from the output layer a probability that the colorimetric value deviates from an exemplary value, and causing a visual indicator on a user interface that the vehicle component should be removed from an assembly line due to the probability that the colorimetric value deviating from the exemplary value.

14. The non-transitory computer learning model according to claim 13, wherein
the colorimetric information of the input layer includes at least color data, sparkle data and coarseness data of the vehicle component.

15. The non-transitory computer learning model according to claim 14, wherein
the color data includes a red-green metric and a yellow-blue metric.

16. The non-transitory computer learning model according to claim 14, wherein
the sparkle data includes a sparkle metric and a lightness-darkness metric.

17. The non-transitory computer learning model according to claim 14, wherein
the predetermined detecting angles include 25 degrees with respect to a reference detector angle.

18. The non-transitory computer learning model according to claim 17, wherein
the predetermined detecting angles include 45 degrees with respect to a reference detector angle.

19. The non-transitory computer learning model according to claim 18, wherein
the predetermined detecting angles include 75 degrees with respect to a reference detector angle.

20. The colorimetric compliance control device according to claim 12, further comprising
a vehicle component flagging module including at least an electronic interface configured to display a visual indicator when the electronic controller determines that the output value deviates from the predetermined exemplary value.

* * * * *